United States Patent [19]

Bier et al.

[11] 4,314,928

[45] Feb. 9, 1982

[54] POLYETHYLENE TEREPHTHALATES WHICH CRYSTALLIZE RAPIDLY AND A PROCESS FOR THEIR PREPARATION

[75] Inventors: Peter Bier; Rudolf Binsack, both of Krefeld, Fed. Rep. of Germany

[73] Assignee: Bayer Aktiengesellschaft, Leverkusen, Fed. Rep. of Germany

[21] Appl. No.: 164,458

[22] Filed: Jun. 30, 1980

Related U.S. Application Data

[63] Continuation of Ser. No. 67,860, Aug. 20, 1979, abandoned, which is a continuation of Ser. No. 875,048, Feb. 3, 1978, abandoned.

[30] Foreign Application Priority Data

Feb. 14, 1977 [DE]  Fed. Rep. of Germany ....... 2706123

[51] Int. Cl.$^3$ ............................................. C08L 67/00
[52] U.S. Cl. ............................. 260/40 R; 260/40 P; 525/444
[58] Field of Search ............. 525/444; 260/40 R, 40 P

[56] References Cited

U.S. PATENT DOCUMENTS

| | | | |
|---|---|---|---|
| 3,498,952 | 3/1970 | Wiener | 260/75 |
| 3,592,876 | 7/1971 | Brinkmann et al. | 260/873 |
| 3,678,128 | 7/1972 | Riemhofer et al. | 260/850 |
| 3,714,126 | 1/1973 | Reid | 260/75 R |
| 3,789,031 | 1/1974 | Buttner et al. | 260/75 T |
| 3,926,920 | 12/1975 | Georgoudis et al. | 260/75 R |
| 3,948,859 | 4/1976 | Sublett et al. | 260/75 R |
| 4,069,278 | 1/1978 | Borman | 260/860 |
| 4,086,212 | 4/1978 | Bier et al. | 260/40 P X |
| 4,107,149 | 8/1978 | Bier et al. | 528/309 |
| 4,136,089 | 1/1979 | Bier et al. | 528/309 |
| 4,176,224 | 11/1979 | Bier et al. | 528/309 |
| 4,223,106 | 9/1980 | Bier et al. | 528/173 |

FOREIGN PATENT DOCUMENTS

| | | |
|---|---|---|
| 2507776 | 2/1976 | Fed. Rep. of Germany . |
| 2507674 | 9/1976 | Fed. Rep. of Germany . |
| 2545720 | 4/1977 | Fed. Rep. of Germany . |
| 977104 | 12/1964 | United Kingdom . |
| 985936 | 3/1965 | United Kingdom . |
| 1118538 | 7/1968 | United Kingdom . |
| 1191490 | 5/1970 | United Kingdom . |
| 1191499 | 5/1970 | United Kingdom . |
| 1268442 | 3/1972 | United Kingdom . |

OTHER PUBLICATIONS

Encyclopedia of Chemical Technology, Kirk–Othmer–vol. 13, pp. 844–845–New York, New York.
Die Angewandte Makromolekulare Chemie 65, (1977), 1–21, (NR 1005) English translation.

*Primary Examiner*—J. Ziegler
*Attorney, Agent, or Firm*—Gene Harsh; Lawrence S. Pope

[57] ABSTRACT

The present invention relates to a polyethylene terephthalate copolyester which crystallizes rapidly and a process to synthesize such a polymer. The polymer is produced by melt homogenizing pure polyethylene terephthalate segments (with minimum intrinsic viscosities above about 0.2 dl/g) with certain specified $C_{4-10}$ diols, allowing the mixture to solidify and subjecting the solid product to a solid phase post-condensation reaction. The copolyester has a minimum intrinsic viscosity of 0.4 dl/g and crystallizes more rapidly than either pure polyethylene terephthalate of equivalent molecular weight or copolyester from the same acid and diol units wherein the pure polyethylene terephthalate segments are not significantly prepolymerized before reaction with the co-diols. In a preferred embodiment about 0.23 to 9.1 parts of co-diol per 100 parts of polyethylene terephthalate segment are melt homogenized in an extruder and the extrudate is subject to solid state condensation by the application of elevated temperatures and reduced pressure.

7 Claims, No Drawings

POLYETHYLENE TEREPHTHALATES WHICH CRYSTALLIZE RAPIDLY AND A PROCESS FOR THEIR PREPARATION

This is a continuation, of application Ser. No. 67,860 filed Aug. 20, 1979, which itself is a continuation of application Ser. No. 875,048 filed Feb. 3, 1978, now abandoned.

FIELD OF THE INVENTION

The present invention relates to improved highly crystalline thermoplastic copolyesters which crystallize rapidly and are based on terephthalic acid radicals, ethylene glycol radicals and certain co-diol radicals, and to a process for their preparation.

BACKGROUND OF THE INVENTION

Highly crystalline thermoplastic copolyesters which crystallize rapidly and which are based on terephthalic acid, ethylene glycol and certain co-diols are known. DT-OS (German Published Specification) No. 2,507,674 relates to terephthalic acid copolyester consisting of at least 90 mol %, relative to the dicarboxylic acid component, of terephthalic acid radicals, 90 to 99.5 mol %, relative to the diol component, of ethylene glycol radicals and 0.5 to 10 mol %, relative to the diol component, of co-diol radicals, characterized in that (a) the co-diols employed carry two primary OH groups, (b) these two OH groups are separated by 3 or 4 C atoms and (c) the co-diols employed are either unsubstituted, monoalkyl-substituted or dialkyl-substituted, the alkyl groups carrying 2 or 3 C atoms, and, in the case of substitution, the sum of the C atoms of the alkyl substituents being at least 4.

DT-OS (German Published Specification) No. 2,507,776 relates to terephthalic acid copolyesters consisting of at least 90 mol %, relative to the dicarboxylic acid component, of terephthalic acid radicals, 90 to 99.5 mol %, relative to the diol component, of ethylene glycol radicals and 0.5 to 10 mol %, relative to the diol component, of co-diol radicals, characterized in that (a) the co-diols employed carry at least one secondary or tertiary OH group, (b) the co-diols employed contain 4 to 10 C atoms and (c) the two OH groups are separated by 3 to 4 C atoms.

These copolyesters can be molded at mold temperatures between 110° and 150° C., preferably at about 120° C., and, under these conditions, permit a substantially shortened injection molding cycle time, compared with conventional polyethylene terephthalates.

The copolyesters according to DT-OS (German Published Specification) Nos. 2,507,674 and 2,507,776 can be prepared in a manner which is in itself known by esterifying or transesterifying the dicarboxylic acids, preferably pure terephthalic acid, and/or the corresponding dimethyl esters with 1.05 to 2.4, preferably 1.1 to 1.4, mols of the diols, relative to 1 mol of the dicarboxylic acid component, in the presence of esterification and/or transesterification catalysts between 150° and 250° C. (reaction step A) and subjecting the reaction products thus obtained to a polycondensation reaction under customary conditions, that is to say in the presence of esterification catalysts between 200° and 300° C. under reduced pressure (>1 mm Hg) (reaction step B).

A particularly preferred embodiment consists in admixing the co-diols to the reaction mixture as late as possible, that is to say only after the reaction mixture of terephthalic acid, or of its ester-forming derivatives, with ethylene glycol to give bis-(2-hydroxyethyl) terephthalate has taken place, or, even more advantageously, only after a polyethylene terephthalate prepolymer which has a degree of polycondensation of more than 4 has formed. Thereafter, the mixture can be subjected to a polycondensation reaction in the customary manner, as described above.

SUMMARY OF THE INVENTION

It has now been found that copolyesters with very excellent crystallization characteristics are obtained when the co-diols are only incorporated into the molten homo(polyethylene terephthalate) when this has reached an intrinsic viscosity of at least about 0.2 dl/g.

The invention thus relates to a process for the preparation of improved highly crystalline thermoplastic copolyesters which crystallize rapidly and have an intrinsic viscosity of at least about 0.4 dl/g and which consist of terephthalic acid, and optionally up to about 10 mol %, relative to the terephthalic acid, of other dicarboxylic acids, as well as ethylene glycol and a co-diol with 4 to 10 C atoms, in which the hydroxyl groups are separated by branched or unbranched alkylene groups with 3 or 4 C atoms and which (1) has at least one secondary or tertiary hydroxyl groups or (2) carries two primary hydroxyl groups and is unsubstituted, monoalkyl-substituted or dialkyl-substituted, the sum of the C atoms of the substituents in the case of substitution being at least 4, in the presence of transesterification catalysts, characterized in that 100 parts by weight of polyethylene terephthalate, which is free from co-diol radicals and has an intrinsic viscosity of at least about 0.2 dl/g, and about 0.23 to 9.1 parts by weight of co-diol are mixed, the mixture is homogenized in the melt and the solidified product is subjected to a solid phase post-condensation reaction.

The invention further relates to copolyesters obtainably by this process.

In each case, the intrinsic viscosity is measured at 25° C. as a 0.5% strength by weight solution in a phenol/-tetrachloroethane mixture (weight ratio 1:1).

DETAILED DESCRIPTION OF THE INVENTION

Examples of co-diols which correspond to the above conditions are 2-ethylhexane-1,3-diol; 3-methylpentane-2,4-diol; 2-methylpentane-2,4-diol; 2,2,4-trimethylpentane-1,3-diol; 2,2-diethylpropane-1,3-diol; butane-1,4-diol; hexane-2,5-diol; propane-1,3-diol and butane-1,3-diol. The positive action of the co-diol radicals on the rate of crystallization of the polycondensates according to the invention increases in the sequence indicated.

In addition to terephthalic acid radicals, the polyesters according to the invention can contain up to about 10 mol %, relative to the acid component, of radicals of other aromatic, aliphatic or cycloaliphatic dicarboxylic acids (or of their dimethyl esters), such as, for example, phthalic acid, isophthalic acid, naphthalene-2,6-dicarboxylic acid, diphenyl-4,4'-dicarboxylic acid, adipic acid, sebacic acid or cyclohexanediacetic acid.

The copolyesters according to the invention crystallize considerably more rapidly than pure polyethylene terephthalic and possess a very high melting point, that is to say they possess a combination of properties which is highly desirable and has not been achieved by the terephthalic acid esters known hitherto.

They can be molded at mold temperatures between 110° and 150° C., preferably at about 120° C., and, under these conditions, permit a substantially shorter cycle time than conventional polyethylene terephthalates containing nucleating agents. The rate of crystallization can be increased even further by the addition of nucleating agents.

As a rule, the solid phase post-condensation reaction is carried out by heating the granular product, in the solid phase in vacuo or in a nitrogen atom, to a temperature which is about 60°–5° C. below the melting point of the polymer.

The process according to the invention can be carried out discontinuously in appropriate reaction equipment and mixing equipment. The continuous procedure on screw machines is a particularly preferred form, the polyethylene terephthalate and co-diol being metered in together, or the co-diol being added to the polyethylene terephthalate melt.

Compared with the copolyesters according to DT-OS (German Published Specification) No. 2,507,776 and 2,507,674, the copolyesters prepared in this manner have the additional advantage that they crystallize even more rapidly. As a rule, the start of crystallization is about 4°–6° C. above the start of crystallization of comparable copolyesters and 40° to about 50° C. above that of polyethylene terephthalate.

The high crystallinity of the copolyesters, which ensures hardness, dimensional stability and stability of shape even at relatively high temperatures, is achieved more rapidly, and the mold dwell time in the injection cycle is, therefore, considerably shortened.

Both the transesterification of the polyethylene terephthalate with the co-diol and the solid phase post-condensation reaction are accelerated by esterification catalysts, such as are described, for example, by R. E. Wilfang in J. Polym. Sci. 54, 385 (1961). They are employed in amounts of about 0.001 to 0.2% by weight, relative to the dicarboxylic acid component used in the preparation of the pure polyethylene terephthalate segments may be retained, and, thus, effect the incorporation of the co-diol and the solid state post-condensation.

In order to provide protection against thermo-oxidative degradation, the customary amounts, preferably about 0.001 to 0.5% by weight, relative to the non-filled and non-reinforced copolyesters, of stabilizers can be added to the copolyesters according to the invention. Suitable stabilizers are, for example, phenols and phenol derivatives, preferably sterically hindered phenols which contain alkyl substituents with 1–6 carbon atoms in both the o-positions relative to the phenolic hydroxyl group, amines, preferably secondary arylamines and their derivatives, phosphates and phosphites, preferably their aryl derivatives, quinones, copper salts of organic acids and addition compounds of copper-I halides with phosphites.

The copolyesters, according to the invention, can, of course, be reinforced with reinforcing materials. Metals, silicates, carbon and glass, mainly in the form of fibers, fabrics or mats, have proved suitable reinforcing materials. Glass fibers are the preferred reinforcing material.

In addition, inorganic and organic pigments, dyestuffs, lubricants and release agents, such as zinc stearate, UV absorbers and the like can, of course, be added in the customary amounts if desired.

In order to obtain flame-resistant products, about 2 to 20% by weight, relative to the molding composition, of flameproofing agents which are in themselves known, such as, for example, halogen-containing compounds, elementary phosphorus or phosphorus compounds, phosphorus-nitrogen compounds or antimony trioxide, or mixtures of these substances, preferably antimony trioxide, decabromodiphenyl ether and tetrabromobisphenol A polycarbonate, are added.

The rate of crystallization of the copolyesters, according to the invention, can be further increased by the addition of 0.01 to 1% by weight, relative to the non-filled and non-reinforced copolyesters, of nucleating agents. Suitable nucleating agents are compounds known to those skilled in the art, such as are described, for example, in Kunststoff-Handbuch (Plastics Handbook), Volume III, "Polyester" ("Polyesters"), page 701, 1973, Carl Hanser Verlag, Munich.

The copolyesters, according to the invention, are excellent starting materials for the production of films and fibers, and preferably for the production of moldings of all types by injection molding.

EXAMPLES

The samples were characterized by their intrinsic viscosity and the thermodynamic data important for the melting and crystallization characteristics, such as the fusion enthalpy ($\Delta H_m$), melting point ($T_m$) and crystallization point ($T_c$).

The sooner the polymer crystallizes out, at a constant rate of cooling and under otherwise identical experimental conditions, the higher is the rate of crystallization; that is to say the supercooling $\Delta T = T_m - T_c$ indicates when the rate of crystallization reaches its maximum under the cooling conditions used.

In the examples which follow, the parts given are parts by weight.

EXAMPLES 1 TO 5

100 parts of polyethylene terephthalate granules, with an intrinsic viscosity of 0.672 dl/g (measured at 25° C. as a 0.5% strength by weight solution in a phenol/tetrachloroethane mixture in the weight ratio 1:1) are intimately mixed together with 0.23–9.1 parts of co-diol in a mixer and the mixture is then melted in a twin-screw extruder and homogenized in the melt at 260° C. The polyester melt is spun off through a water bath and granulated and the granules are subjected to a poly-condensation reaction in a tumbler drier at 225° C. in a stream of nitrogen.

COMPARISON EXAMPLES 6–10

5,826 g (30 mols) of dimethylterephthalate and 4,104 g (66 mols) of ethylene glycol are heated, in the presence of 4.6 g of calcium acetate*, at 200° C. in a 25 l autoclave for 2 hours, while stirring and passing nitrogen over, whereupon methanol distills off. After the transesterification has ended, 36 ml of $GeO_2$ solution** (5% strength by weight in ethylene glycol), 6 g of trisnonyl phosphite and 13.2 to 524.6 g of co-diol are added. The temperature is raised to 210° C. and kept at this value for 2 hours. Thereafter, the temperature is increased to 250° C. in the course of a further hour and at the same time the apparatus is evacuated (>1.0 mm Hg). Finally, the mixture is stirred for a further 2 hours at 250° C. and under a pressure of less than 0.5 mm Hg. The polyester melt is then spun off through a water bath and granulated, and the granules are subjected to a polycondensation reaction in a tumbler drier at 225° C. in a stream of nitrogen.

*The nature and relative proportion of catalyst corresponds to that which was present in Examples 1-5 (according to the invention) from the preparation of the polyethylene terephthalate segments.
**The nature and relative proportion of catalyst corresponds to that which was present in Examples 1-5 (according to the invention) from the preparation of the polyethylene terephthalate segments.

Examples 1-5 (Table 1) describe the copolyesters prepared by the process according to the invention. The value of the supercooling for these products is about 5° C. lower than for the copolyesters prepared according to DT-OS (German Published Specification) No. 2,507,776 and 2,507,674 (Examples 6-10), that is to say the copolyesters prepared by the process according to the invention crystallize more rapidly than those according to the state of the art. Examples 11 and 12 give the corresponding data for pure polybutylene terephthalate and polyethylene terephthalate.

TABLE 1

| Examples | Co-diol Type | Amount (mol %) | $[\eta]$ [dl/g] | $\Delta H_m$ [cal/g] | $T_m$ [°C.] | $T_c$ [°C.] | $T_m - T_c$ [°C.] |
|---|---|---|---|---|---|---|---|
| 1 | 2-Ethylhexane-1,3-diol | 0.6 | 0.79 | 9.0 | 250.5 | 201 | 49.5 |
| 2 | Butane-1,4-diol | 4 | 0.78 | 9.2 | 257.5 | 201.5 | 56.9 |
| 3 | 2,2,4-Trimethylpentane-1,3-diol | 5 | 0.78 | 9.4 | 256 | 200 | 56.0 |
| 4 | 2-Methylpentane-1,4-diol | 5 | 0.81 | 9.6 | 258 | 201 | 57.0 |
| 5 | 3-Methylpentane-2,4-diol | 5 | 0.80 | 9.0 | 255 | 202 | 53.0 |
| 6 | 2-Ethylhexane-1,3-diol | 0.6 | 0.78 | 8.8 | 251 | 195 | 56.0 |
| 7 | Butane-1,4-diol | 4 | 0.77 | 8.9 | 256 | 193.5 | 62.5 |
| 8 | 2,2,4-Trimethylpentane-1,3-diol | 5 | 0.80 | 9.0 | 256 | 196 | 60.0 |
| 9 | 2-Methylpentane-1,4-diol | 5 | 0.81 | 9.2 | 258 | 197 | 61.0 |
| 10 | 3-Methylpentane-2,4-diol | 5 | 0.81 | 8.9 | 255 | 196.5 | 58.5 |
| 11 | Polybutylene terephthalate | | 0.87 | 9.2 | 226 | 173 | 53.0 |
| 12 | Polyethylene terephthalate | | 0.72 | 7.8 | 255 | 152 | 103.0 |

The symbols used in the table have the following meanings:

$[\eta]$ intrinsic viscosity in phenol/tetrachloroethane 1:1, measured in an Ubbelohde capillary viscometer, polymer concentration: 0.5 g/dl, temperature 25° C.;

$\Delta H_m$: fusion enthalpy;

$T_m$: melting point;

$T_c$: crystallization point, measured with a DSC 2 (Perkin Elmer) using a sample weight of about 10 mg and a heating and cooling rate of 20° C./minute.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a highly crystalline thermoplastic copolyester which crystallizes rapidly on cooling from above the melt temperature of the copolyester;

(A) said copolyester having an intrinsic viscosity of at least 0.4 dl/g (at 25° C. in 1:1 phenol tetrachloroethane); and consisting of the condensation product of
  (1) a dicarboxylic acid component which is at least 90 mol percent terephthalic acid;
  (2) ethylene glycol; and
  (3) a codiol with 4 to 10 carbon atoms in which the hydroxyl groups are separated by a branched or unbranched alkylene group with 3 or 4 carbon atoms wherein said codiol,
    (a) carries at least one secondary or tertiary hydroxyl group; or
    (b) carries two primary hydroxyl groups and is unsubstituted, monoalkyl-substituted or dialkyl-substituted with the sum of the carbon atoms of the substituents being at at least 4; and (B) said process comprising the steps of
  (1) feeding 100 parts of a polyethylene terephthalate segment having an intrinsic viscosity of at least 0.2 dl/g (at 25° in 1:1 phenol/tetrachloroethane) per 0.23 to 9.1 parts of codiol and an appropriate amount of transesterification catalyst to a screw machine;
  (2) operating the screw machine so as to homogenize the melt of these components; and
  (3) subjecting the recovered solidified product to a solid-state post-condensation treatment at between about 200° C. and the softening point of the copolymer.

2. A process according to claim 1, in which the codiol selected from the group consisting of 2-ethylhexane-1,3-diol; 3-methylpentane-2,4-diol; 2-methylpentane-2,4-diol; 2,2,4-trimethylpentane-1,3-diol; 2,2-diethyl-1,3-diol; butane-1,4-diol; hexane-2,5-diol; propane-1,3-diol and butane-1,3-diol.

3. A process according to claim 1, in which the acid component contains up to 10 mol % of an acid selected from the group consisting of phthalic acid, isophthalic acid, naphthalene-2,6-dicarboxylic acid, diphenyl-4,4'-dicarboxylic acid, adipic acid, sebacic acid and cyclohexanediacetic acid.

4. The high crystalline thermoplastic copolyester produced by the process of claim 1.

5. A thermoplastic copolyester as claimed in claim 4, when reinforced by a metal, silicate, carbon or glass in the form of fibers, a fabric or a mat.

6. The process of claim 1 wherein the solid state post-condensation is conducted under streaming nitrogen or reduced pressure.

7. The process of claim 1 wherein the dicarboxylic acid component is essentially 100 mol percent terephthalic acid.

* * * * *